(No Model.)
J. H. OSBORNE.
Steam Heater.
No. 230,193. Patented July 20, 1880.
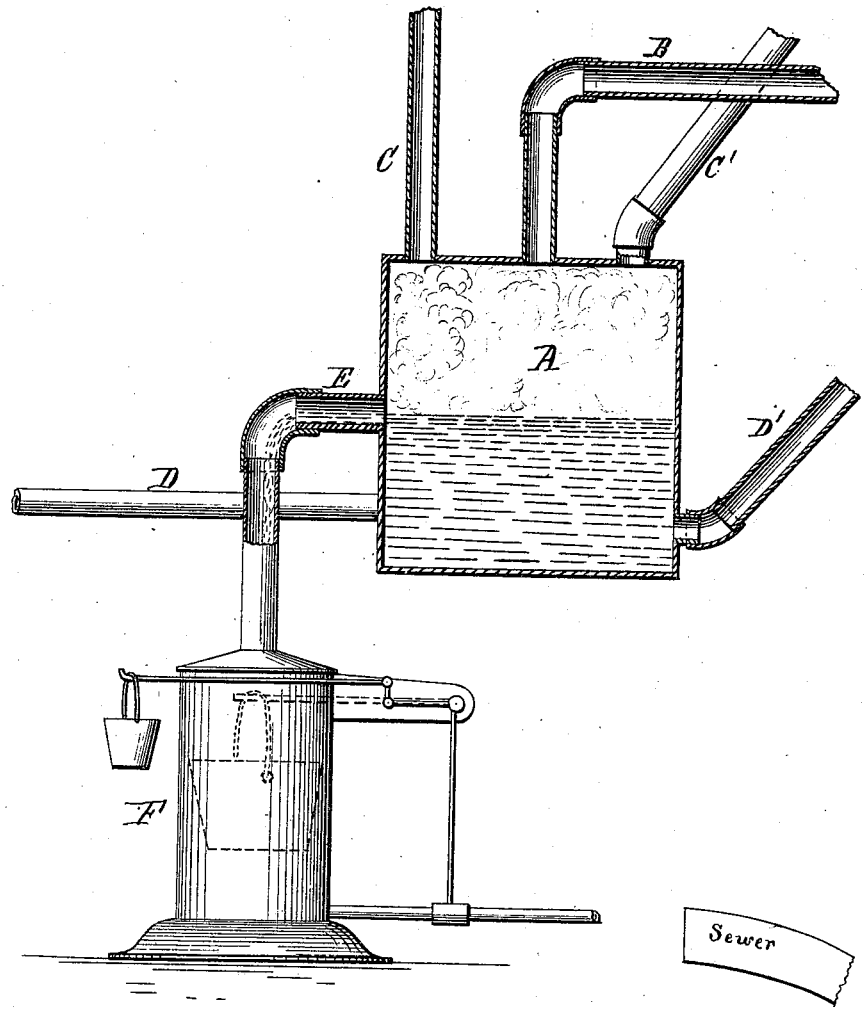
Witnesses:
Franck L. Ourand
Harry Ginckel
Inventor:
John H. Osborne
by A. M. Smith
atty.

UNITED STATES PATENT OFFICE.

JOHN H. OSBORNE, OF AUBURN, NEW YORK.

STEAM-HEATER.

SPECIFICATION forming part of Letters Patent No. 230,193, dated July 20, 1880.

Application filed April 20, 1880. (No model.)

*To all whom it may concern:*

Be it known that I, JOHN H. OSBORNE, of Auburn, county of Cayuga, State of New York, have invented a new and useful Improvement in Steam-Heating Apparatus, of which the following is a full, clear, and exact description, reference being had to the accompanying drawing, making part of this specification, and which represents a vertical section through my improved receiver and distributer, showing also the trap in side elevation.

My invention relates to a novel arrangement of receiver and distributer interposed between the steam generator and the radiators, and between the radiators and the trap, through which the water of condensation is discharged for the purpose of equalizing the supply of steam and keeping the trap at all times in working condition, as hereinafter explained.

The invention is applicable to that class of steam-heaters in which the water of condensation is not returned to the boiler in which the steam is generated, but is passed off into the sewer or drain through a steam-trap or analogous device. In this class of heaters the steam-pipes which supply the radiators are ordinarily connected with a main steam-pipe from the generator, or directly with the generator itself, and the return-pipes are connected directly with a main return-pipe which enters the trap. This system of heating, as will be seen, includes four distinct features, as follows, viz: first, a supply pipe or pipes connected with the source of steam-supply and leading thence to and connected with the radiating pipes or boxes, and usually provided with valves for admitting or shutting off the steam; second, radiators—that is, pipes or boxes—for receiving and retaining the steam until it has parted with a portion of its heat or been condensed into water; third, a return pipe or pipes attached to each radiator (usually with a valve interposed) for conducting the water of condensation and steam therefrom to the trap; and, fourth, the steam-trap with which the return-pipes are all, either directly or indirectly, connected, said trap being operated by the steam and the water of condensation for regulating the discharge of the latter.

The trap is designed to hold at all times a sufficient quantity of water to prevent the steam from escaping, while at the same time, when the water rises beyond a certain level in the trap, the valve opening into the drain will be automatically operated to permit the water to escape until it sinks again to the level referred to, when the valve closes. The construction of a trap for this purpose is well understood, and it need not therefore be described here.

The object of this construction of trap is to prevent the escape of live steam, and at the same time prevent the water from rising into and choking the return-pipes, and to do this it will be seen that both water and steam must be present in the trap to insure its perfect working and prevent the backing of the water into the pipes.

Under the above-described system of heating, as hitherto employed, as long as a constant flow of steam to the radiators, and of water and steam from the radiators to the trap, is maintained, the operation of the apparatus is found to be entirely satisfactory; but when the flow of steam in the supply-pipe, or of water and steam in the return-pipe, is cut off or obstructed the following result ensues:

The steam in the apparatus back to the point of obstruction will at once begin to condense, and as no fresh steam is admitted to supply its place a partial vacuum is created, or is ready to be created, which can be relieved only by the backward flow of the water of condensation from the trap into the return-pipes, and while the obstruction remains the water, owing to atmospheric pressure, continues to flow back until the vacuum in the pipes and radiators, either or both, is relieved, or all the water in the trap is exhausted, in which case the remaining space in the pipes will be filled with air; or, if there be no water in the trap, then the return-pipe will be filled with air and with the water of condensation from the steam that filled the pipe at the moment of obstruction. The water of condensation having thus filled one or more of the return-pipes, if now the obstruction be removed, and by the admission of steam the water in the pipes is permitted to flow into the trap, if there is sufficient water to fill the latter and cut off the admission of steam thereto, the trap will be rendered inoperative, and until it is relieved of the excess of water, or is set in action again by some means extraneous thereto, the entire apparatus becomes practically inoperative.

The object of my invention is to overcome this difficulty and prevent the clogging or choking of the trap; and to this end the invention consists in the employment of a receiver interposed between the generator and the radiators, and between the latter and the trap, through which receiver the steam passes to the radiators and trap, and through which, also, the water of condensation from the radiators and return-pipes passes to the trap, whereby the latter is at all times kept unobstructed in its operation.

In the accompanying drawing, A represents a chamber or receiver of any suitable size conforming to the size of the apparatus or the number and size of the radiators to be supplied.

B is the main steam-supply pipe connecting the receiver with the boiler or steam-generator, and C C' are steam-supply pipes leading from the receiver to the radiators, said pipes being connected with the receiver A at or near its upper end.

D D' represent return-pipes, leading from the radiators back to the receiver A, and connected with the latter at or near its lower end.

E is a pipe connected with the receiver A at or near midway its height, as shown, and leading thence to and connecting said receiver with a steam-trap, F, and of sufficient diameter to permit the ready escape of the water of condensation from the receiver into the trap without filling the pipe.

By this arrangement, it will be seen, live steam can at all times pass from the receiver directly into the trap, thereby insuring its continuous automatic action. The water of condensation must first fill the receiver up to the level of pipe E before it can escape therefrom into the trap F, and in so doing covers or submerges the ends of the return-pipes connected with the receiver, and, as will be seen, if the valves in the supply or return pipes connecting the radiators with the receiver be closed and a vacuum be created therein, as explained above, it will be filled by the water of condensation and steam in the receiver without interfering with the action of the trap, which would still continue to receive its supply of live steam from the receiver A necessary to maintain it in working condition.

Another advantage resulting from the use of the receiver is as follows, viz: Where the steam is generated at some distance from the place where it is brought into use the pipes by which it is conveyed, however well covered, are unavoidably subject to a certain degree of exposure, so that the heat will be radiated, and condensation of the steam in greater or less quantity, according to the degree of exposure, will be the result. This condensed steam in the conveying-pipes is carried along by and with the live steam in the form either of water or spray, and upon entering the place where it is to be used, if there be no receiver between the generator and the radiators, goes with the steam into the radiators, and thence to the trap; but where the steam is first delivered into the receiver the water or spray carried by or contained in it is at once precipitated into the water that occupies the lower portion of the receiver, and the steam thus relieved proceeds to the radiators in a much dryer condition, and in a condition that renders it much more economical and effective for the uses of heating and of power.

The trap shown is of the form employing a float, which rises and falls with the water in the trap for opening and closing the escape-valve, and the water discharged may pass directly into the drain or sewer, or indirectly through a hot-water radiator, for utilizing its heat, if desired; but the trap, as also the generator, radiators, valves, &c., may be of any usual or preferred form of construction and arrangement.

Having now described my invention, I claim—

1. In a steam-heating apparatus, a steam chamber or receiver connected by steam-pipes with the generator and radiators, the latter being also connected by return-pipes with said chamber, which is interposed between the radiators and the trap, the water of condensation passing through the same to the trap, substantially as and for the purpose specified.

2. The chamber or receiver A, for the reception of the live steam and the water of condensation, in combination with the steam supply and distributing pipes B and C, the return-pipes D D', and the pipe E, connecting said receiver with the trap, all arranged and operating substantially as described.

In testimony whereof I have hereunto set my hand this 16th day of April, A. D. 1880.

JOHN H. OSBORNE.

Witnesses:
C. W. UPHAM,
C. OHLMEYER.